United States Patent [19]

Zhao

[11] Patent Number: 5,920,864
[45] Date of Patent: Jul. 6, 1999

[54] MULTI-LEVEL CATEGORY DYNAMIC BUNDLING FOR CONTENT DISTRIBUTION

[75] Inventor: Yan Zhao, Fulton, Md.

[73] Assignee: International Business Machines Corporation, Armonk, N.Y.

[21] Appl. No.: 08/926,206

[22] Filed: Sep. 9, 1997

[51] Int. Cl.[6] .................................................. G06F 17/00
[52] U.S. Cl. ........................... 707/10; 707/201; 707/100; 707/205; 707/8
[58] Field of Search ....................... 707/1–206, 501–533; 395/701–705, 81–85

[56] References Cited

U.S. PATENT DOCUMENTS

| | | | |
|---|---|---|---|
| 5,257,185 | 10/1993 | Farley et al. .............................. | 707/100 |
| 5,500,881 | 3/1996 | Levin et al. .............................. | 395/703 |
| 5,748,961 | 5/1998 | Hanna et al. .............................. | 395/701 |

*Primary Examiner*—Paul R. Lintz
*Assistant Examiner*—David Yiuk Jung
*Attorney, Agent, or Firm*—A. P. Tennent

[57] ABSTRACT

A system and method for retrieving the contents of a digital information system by multi-level categorization is disclosed. The system uses a file table, a category table, and a category bundling table. Headings and directions are displayed on navigation pages to guide the user to the desired file. The description and hierarchy relationship of categories, sub-categories, and files are stored in the tables. When the user selects a category or file and the direction of navigation, the system returns the file, or consults the tables and returns a list of new categories and files for a new navigation page. Moving down and then up through a category usually produces a different navigation page. Dynamic updating of the system categories and files can be easily accomplished by altering the content of the tables.

20 Claims, 7 Drawing Sheets

FIG. 3

| CtID | CtTitle | CtDate | ... | CtTerm |
|---|---|---|---|---|
| ExampleCt1 | Example Category 1 | 02221996 | ... | 1 |
| ExampleCt2 | Example Category 2 | 05081996 | ... | 1 |
| ExampleCt3 | Example Category 3 | 06101996 | ... | 0 |
| ExampleCt4 | Example Category 4 | 01121996 | ... | 0 |
| ... | ... | ... | ... | ... |

FIG. 4

| CtID | ItemID | ItemTerm |
|---|---|---|
| ExampleCt1 | file1.htm | 1 |
| ExampleCt1 | file2.pdf | 1 |
| ExampleCt1 | file3.htm | 1 |
| ExampleCt2 | file1.htm | 1 |
| ExampleCt3 | ExampCt2 | 0 |
| ExampleCt3 | file4.htm | 1 |
| ExampleCt4 | ExampleCt1 | 0 |
| ExampleCt4 | ExampleCt3 | 0 |
| ... | ... | ... |

MULTI-LEVEL CATEGORY DYNAMIC BUNDLING FOR CONTENT DISTRIBUTION

BACKGROUND OF THE INVENTION

1. Field of the Invention

This invention relates, in general, to computer systems and, more specifically, to categorized content retrieval for a digital library.

2. Description of the Prior Art

It is a frequent occurrence that computer users must search a digital information system to locate or obtain contents which best meets their interests. An example of a digital information system is the World Wide Web (www) on the Internet. A vast amount of digitally stored data is available on the web for use by online computer users who can effectively locate the desired materials. Several searching techniques and search engines are known in the prior art and are available for use in performing this process, but these have some restrictions which can make it difficult to locate the area, file, or item of interest.

An advantage of real-time electronic content distribution over traditional paper or CD-ROM media distribution is its interactivity. The traditional distribution methods have fixed organizational and categorized data information which cannot be changed once the media is distributed. Therefore, customized searches and customized information retrieval is impossible. Content-based searches can also be unproductive, whether accomplished on a fixed media or in an online session, when the search parameters are too broad or too narrow. If too broad, too many "hits" of irrelevant matter may make the search results difficult to analyze. If too narrow, some highly relevant materials may be left out of the search results. In order for searches to be most productive, the contents thereof should be categorized more effectively so that the user can navigate through the contents easily and intuitively find the desired information, or data.

Many of the categorization functions provided by existing content distribution facilities are based upon predefined information, which is as static and unchangeable as if distributed on a fixed media like CD-ROM. In these cases, changing the categorization requires a large amount of work and usually requires that the distribution of the data be halted during the process. Consequently, it is desirable, and it is an object of this invention, to provide an efficiently categorized content retrieval mechanism which can be changed dynamically without interrupting the dissemination of the data or information.

While most content retrieval systems display the contents in a tree-type structure and allow navigation to more detailed "branches" on the tree, the navigation paths are fixed and are limited to one direction only. This hampers the user in looking at the contents and finding the area or areas of great relevance. In addition, the starting point for the retrieval of information is usually fixed by the retrieval system and cannot be changed by the user to better define the point at which he wishes to enter the search results. Therefore, it is also desirable, and a further object of this invention, to provide a content retrieval mechanism which is two-direction searchable during user navigation and which can permit different starting points for different users.

SUMMARY OF THE INVENTION

There is disclosed herein a new and useful digital library content locating system which allows the user much freedom in navigating through the contents in order to find the desired information. The contents is arranged according to categories which are linked to each other in a hierarchy relationship of categories and sub-categories. The contents of the library are considered to be files which are also linked to the categories. Pertinent information about all of the listed categories is included in a category table of the system. Similar information about all of the available files is listed in a file table. A category bundling table contains information about the hierarchy relationship between the categories and files. In other words, the category bundling table defines which category is a sub-category of another category and which files belong to certain sub-categories in the hierarchy structure.

The three tables are used by the system of this invention to provide information, or data, which can be used to construct navigation pages which allow intuitive navigation through the hierarchy structure to locate the desired file. During content navigation, the user selects a category on the navigation page and that selection is transmitted to the system, along with the direction of navigation desired, upward or downward. The system then consults the bundling table and determines the information which should be included in the next produced navigation page. If downward navigation was indicated, the bundling table may indicate one or more sub-categories and one or more files which should be included. If upward navigation was selected, parent categories of the selected category or categories of the selected file are included. If a file was selected, the navigation is complete and the system obtains the file for the user.

The navigation pages display the category and file titles and the directions of navigation permitted. The user can easily use these pages to route through the categorized contents of the library to located the desired file. Because of the interactive nature of the invention, a downward movement from a navigation page followed by an upward movement from the same file or category usually will produce a different navigation page. Changing the contents of the library or the hierarchy relationships between the categories, sub-categories, and files is easily accomplished by modifying entries of the tables according to methods which assure that all three tables are updated when necessary. Because only the contents of the tables are changed, the presentation updating can be done dynamically without interrupting the operation of the system. This system can be applied together with conventional search mechanisms to limit the scope of the search to only relevant topics.

BRIEF DESCRIPTION OF THE DRAWINGS

Further advantages and uses of this invention will become more apparent when considered in view of the following detailed description and drawings, in which:

FIG. 3 is a category table with example data as used in a specific embodiment of the invention;

FIG. 4 is a category bundling table with example data as used in a specific embodiment of the invention;

DETAILED DESCRIPTION OF THE PREFERRED EMBODIMENTS

Figures 1, 2:
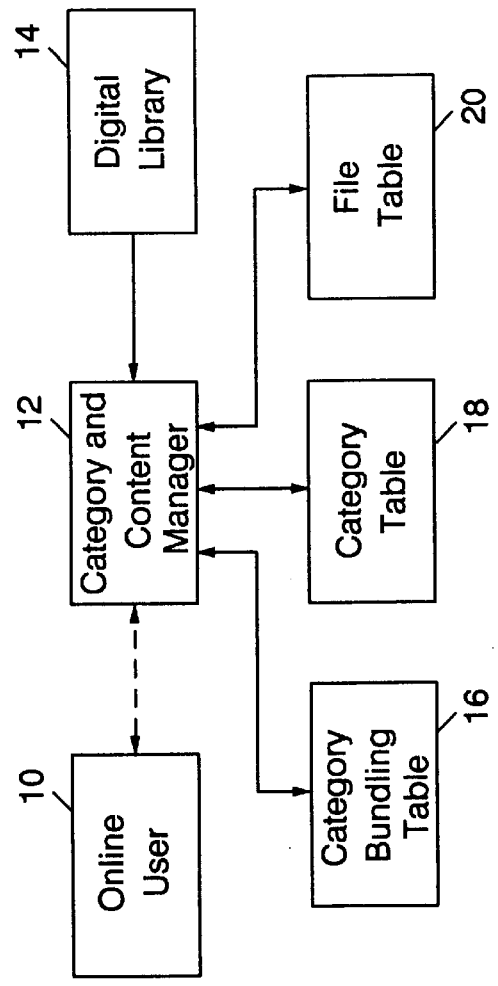
FIG. 1 is a block diagram of the environment in which the present invention functions, according to one specific embodiment.
FIG. 2 is a file table with example data as used in a specific embodiment of the invention.

Throughout the following description, similar reference characters refer to similar elements in all of the figures of the drawings.

Referring now to the drawings, and to FIG. 1 in particular, there is shown a block diagram of the environment in which the present invention functions. An online computer user 10, usually at a remotely located computer, is seeking to obtain information from the digital library 14. The category and content manager 12 provides the user interface to the library 14 and provides the functions of making it easy for the user to navigate through the contents available in the library in order to find the most relevant information. The digital library 14 can be any of various computer data repositories, including the World Wide Web (www) available on the Internet. The manager 12 is primarily concerned about efficient categorized content retrieval of information in the digital library 14, and may be used in association with any of the conventional search engines to originally narrow the categories. In some cases, the user can start the navigation from a previously defined page, or home page which is familiar to the user, thus eliminating some prior steps in starting to navigate through the pages provided by this invention.

The category and content manager 12 performs the function of providing an interface to the user 10 which allows the user to quickly step through categorized titles, sub-titles, and file titles in various directions until the desired information is discovered. At that time, the user can access or download the information, which may be a text data file, a graphics file, and audio or video file, or any other file, data, or information which can be stored in a digital library. For example, the content may be yellow page directory listings or published book and journal contents, either on the www or through a client/server system.

The manager 12 uses the category bundling table 16, the category table 18, and the file table 20 in performing its functions. The file table 20 lists the files, or data, available for use in presenting the contents to the user, and will be described in more detail in connection with FIG. 2. The category table 18 lists the categories and sub-categories available for use in presenting the contents to the user, and will be described in more detail in connection with FIG. 3.

The category bundling table 16 lists the relationships between the categories, sub-categories, and available data files in order to systematically define and present the categories and contents to the user, and will be described in more detail in connection with FIG. 4. The manager 12 uses the information contained in the tables to fashion or create a displayed screen, or navigation page, which allows the user to step through the available choices in an efficient and quick manner, and one which can be changed easily as content and relationships change. All of the tables can be contained in digital memory of a computer system, either at permanently allocated and grouped memory locations, structured locations in the software which defines the operation of the manager 12, or in other forms consistent with the operation of the invention.

FIG. 2 illustrates a table of data defined herein as the file table 20 (FIG. 1). The FileID, column 22, contains a convenient computer recognizable file identifier for the data, information, or file which the system uses. The FileLoc, column 24, contains the location in the system of the associated FileID in column 22. The examples shown in FIG. 2 can be for Internet www content or client/server service systems, as well other content distribution systems. The FileTitle, column 26, contains a normal text name for the file which will be displayed for viewing by the user. In this listing, a generic "ExampleFile1" is listed as the file's title for the first row entry. The Format, column 28, lists the format of the associated file, and the FileDate, column 30, lists the date of the file. The file table of FIG. 2 contains a listing for each file associated with a content service or distribution system, although only four are shown in this example. Additional information in more columns may be included when desirable.

FIG. 3 illustrates a table of data defined herein as the category table 18 (FIG. 1). The CtID, column 32, contains a computer recognizable character string as the category identifier, which identifies a category used by the system. In this illustration, generic CtID's are shown, such as "ExampleCt1" in the first row entry. In many cases, the listed category may be a sub-category of another category, or an upper level, or parent, category of another category. The CtTitle, column 34, contains a normal text name for the category which will be displayed for viewing by the user. In this listing, a generic "Example Category 1" is listed for the first listing. The CtDate, column 36, lists the date the category was created and/or placed into the table. In this example, as in others in this description, the dates are in month-day-year format. Additional column data and entries can be added if desired, as indicated by the extension rows and columns in the table. The CtTerm, column 38, indicates whether a listed category is a terminate category, that is, one in which there are no sub-categories associated therewith. The first two entries in the table have the CtTerm set to 1 which indicates that they are terminate categories, whereas the last two entries are set to 0 to indicate that they are not terminate categories and have one or more sub-categories associated therewith. For clarity, the CtTerm's shown in FIG. 3 are consistent with the category relationships shown elsewhere in this description.

FIG. 4 illustrates a table of data defined herein as the category bundling table 16 (FIG. 1). The CtID, column 40, contains category identifiers which are similar to those shown in the category table of FIG. 3. The ItemID, column 42, contains either a file (FileID) or category (CtID) entry for each listing. The CtID and ItemId columns define a containment relationship between a category and a sub-category or content file. The ItemTerm, column 44, indicates whether the associated item is a terminate item or not. For example, a "1" indicates that the associated item is a terminate item, which essentially means that there can be no downward navigation to more specific items. Data files are always terminate items. If a "0" is listed, the associated item is not a terminate item, and further narrowing navigation is possible, whether to a sub-category or to a terminate data file. It is emphasized that some of the listings in the depicted tables are for illustration purposes only and that the actual arrangement and storage of data to represent these tables can be in different forms without departing from the invention. The tables primarily illustrate the type of data used by the system and the association between the data, or table entries.

The bundling table of FIG. 4 determines the relationship, or hierarchy, of the various categories and data files which will be used to guide the user through the process of locating a particular file, data, or information item. The table is independent of the contents, or data, that it lists, although the creation of the table can be based upon information from each content file, as well as by human knowledge of the interrelationship between the items and categories. The categories and items in the table can be easily changed (added to, removed, etc.) whenever necessary without interrupting the system service operation. In the specific example shown, the items listed in column 42 include both data files (terminate items) and categories (which are sub-categories because of the hierarchy structure). The table of FIG. 4 is consulted by the system to create the next navigation page when a user selects a category on the existing navigation page. The entries file1.htm, file2.pdf, and file3.htm are all terminate files belonging to category ExampleCt1. Note in the seventh entry row that ExampleCt1 is a non-terminate item to category ExampleCt4. Note also that file1.htm in the fourth row is also associated with category ExampleCt2. This indicates that a navigation down from category ExampleCt1 to file1.thm would then produce a navigation page allowing upward navigation to a new category, ExampleCt2, in addition to category ExampleCt1. Thus, it can be seen that navigation down to an item can lead different routes on the way back up, not just retracing the same path used on the way down. In other words, due to the fact that multiple upper-level categories are possible, further navigation may go to other routes. This provides a means to find relevant information topics.

During navigation, the user is presented with various routes to take in furtherance of the objective of locating a desired file, or information. Generally, the system gets a request from the user and builds the next navigation page from information in the three tables. Then the process is repeated until the user locates the desired file.

Figure 5:
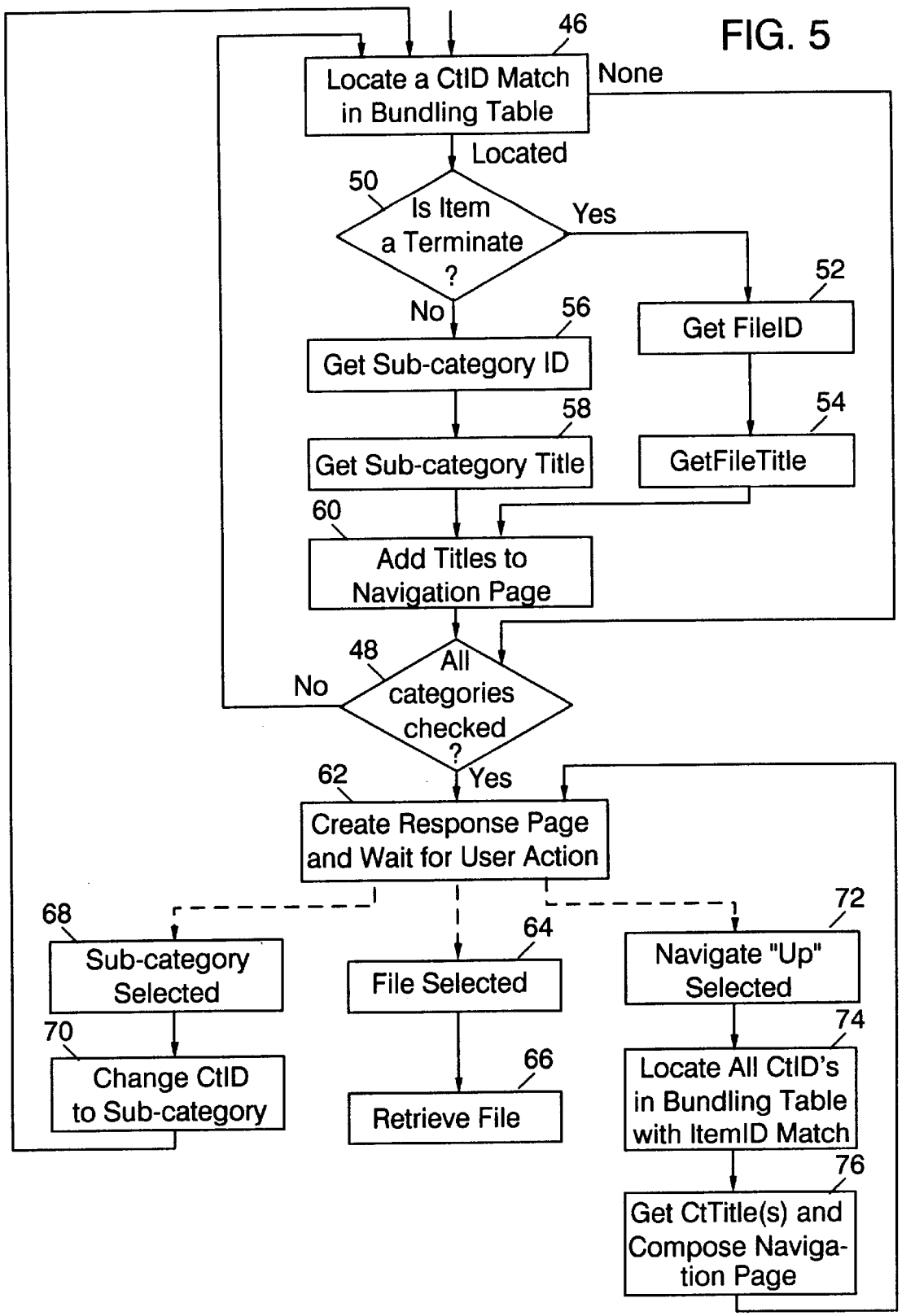
FIG. 5 is a flow chart illustrating how library content is bundled and distributed according to a specific embodiment of the invention.

FIG. 5 illustrates an arrangement for processing and providing this information. According to block 46, the system begins to process a selection of a particular category by first looking in the CtID column of the bundling table and locating a matching category ID. If a match is not found, process flow goes directly to block 48. (Most likely, the root category page is created.) If one is located, a determination is made (block 50) whether or not the ItemID associated with that category is a terminate item. If so, it must be a file, so the FileID is obtained (block 52) from the bundling table, the FileTitle is obtained (block 54) from the file table, and the title is added to the navigation page being constructed (block 60). If the item is not a terminate item, it is assumed to be a category (and usually a sub-category) and the category ID (CtID) is obtained (block 56) from the bundling table, the category title (CtTitle) is obtained (block 58) from the category table, and the title is added to the navigation page being constructed (block 60). Block 48 determines if all the entries with the designated category have been processed and, if not, process flow is directed back to block 46 to repeat the process until all the entries have been located. According to block 62, the page is completed and sent to the user. The user's response to the page can trigger further navigation. In other words, the page is setup so that the user can clickN on another category or file and the system will be able to tell which category or file was selected. Although not shown for clarity, the page is sent to the user and the response is then received for further processing.

When the user selects a data file (block 64) on the new navigation page, the system responds by retrieving the file (block 66) and sending it to the user, or other appropriate action for the particular file, such as running the file for the user. The user may elect to look in more depth for the desired file, so a downward movement in the navigation page is appropriate. This is accomplished by selecting a sub-category (block 68) on the new navigation page. The system next uses the newly selected sub-category as the current CtID (block 70) and repeats the process of creating a new navigation page by returning to block 46 with the new CtID. The user may elect to shift the navigation in an upward direction (block 72) through the categories. This is accomplished by the user selecting a navigation pointer on the page. The system next locates (block 74) all of the CtID's in the bundling table which are associated with the selected ItemID. From those CtID's, the system obtains the titles (block 76) from the category table and produces another navigation page with these titles. Flow is then redirected to block 62 where the page is generated and sent to the user. Thus, the user has the ability to move upwards through a hierarchy of levels or ranks of categories which are related to each other as defined in the bundling table.

Figure 6:
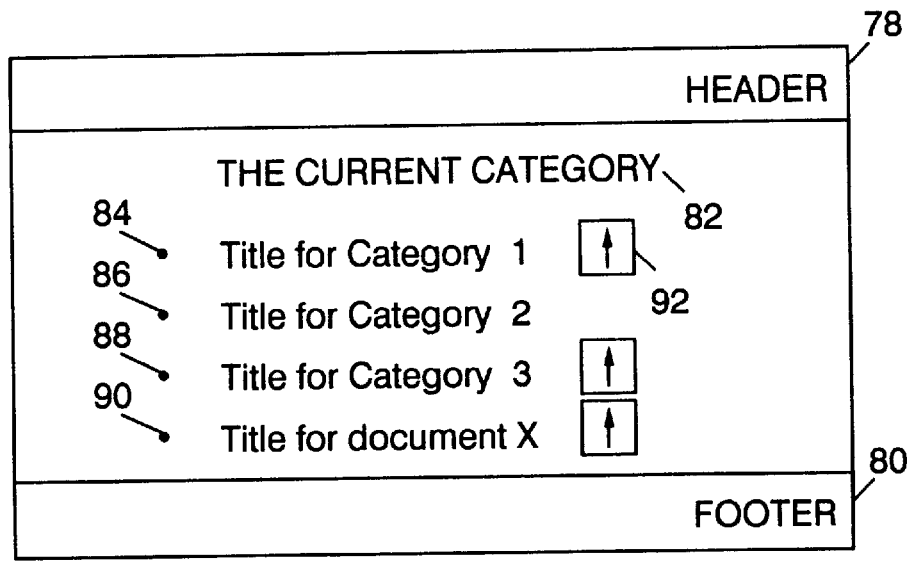
FIG. 6 is a representation of a distributed middle-level content page according to a specific embodiment of the invention.

FIG. 6 illustrates a middle-level navigation page which can be generated by the system of this invention and displayed at the users computer, or terminal. It should also be understood that instead of the system actually generating the page in the format shown, it may simply supply the information needed to generate the page at and by the user's computer. The header 78 and footer 80 portions of the page can contain normal navigation information and selections, such as the name of the database (i.e., the Publisher's Logo when an online publishing system), print and file "buttons", and exit "buttons", to list only a few possibilities.

Being a middle-level navigation page, the illustration in FIG. 6 includes the titles of items for which upward and downward navigation is possible. The current category 82 is indicated on the page for general information to the user. In this example, it could be a user's starting category or a category from which the user last made a downward navigation. This navigation page includes the three sub-categories 84, 86 and 88 which are listed in title form (from the category table), and the document X title 90 which would be the description of a terminate file (from the file table). Title 84 allows navigation in both directions. To navigate upwards, the user selects the arrow 92, the selection is sent to the system of this invention, and a new page is developed in accordance with the hierarchy relationships set forth in an appropriate category bundling table (the categories shown in FIG. 6 are not necessarily using the table entry data shown in FIG. 4). To navigate downwards, the title 84 can be selected and a new page is generated with the selected category as the current category and new sub-categories and files, if any, are listed with the permissible navigation directions. Title 86 may only be selected for downward navigation, since it is a terminate category in this depiction. Consequently, no "up", arrow is included for user selection. Titles 88 and 90 are available for navigation in both directions, similar to title 84. However, selecting title 90 does not produce a new navigation page, but selects the document X.

Figure 7:
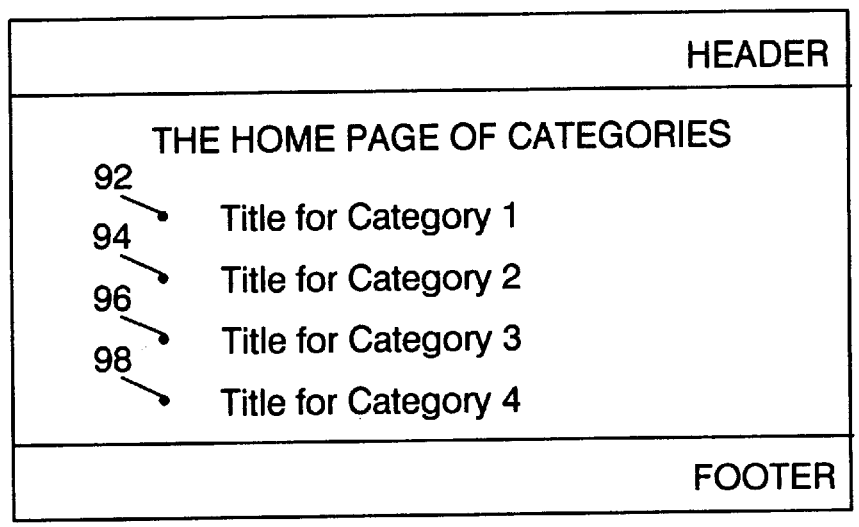
FIG. 7 is a representation of a distributed top-level content page according to a specific embodiment of the invention.

FIG. 7 represents another navigation page, and is a top-level, root, or system home page. It provides a common starting point for the system. Thus, none of the titles 92, 94, 96 or 98 have upward navigation arrows associated therewith. Selecting the title can only lead to downward navigation which will list sub-categories and/or documents.

Figure 8:
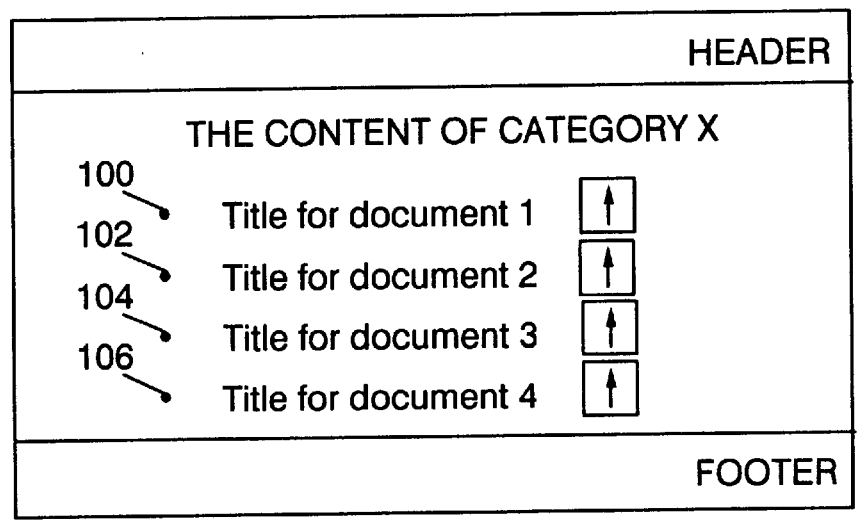
FIG. 8 is a representation of a distributed content page at the terminate level according to a specific embodiment of the invention.

FIG. 8 represents the lowest level, or terminate, page and only navigation upwards from the titles 100, 102, 104 and 106 is possible. Selection of the title instead of an adjacent "up" arrow will select the named document for use and/or retrieval. This type of navigation page can only be generated when all of the titles are terminate documents, or files.

Maintaining the usefulness of the content distribution system requires a certain amount of maintenance to keep the system accurately setup to connect the proper categories and files. Thus, it is necessary to update the various tables when categories and/or files are to be changed, added, or removed. Since each table is somewhat related to the other tables and the operation of the complete system, it is not possible to just act on one table alone. Care must be taken to manage all tables together as a whole when something needs to be changed. The tables can be changed at any time without interrupting the operation of the system.

Figure 9:
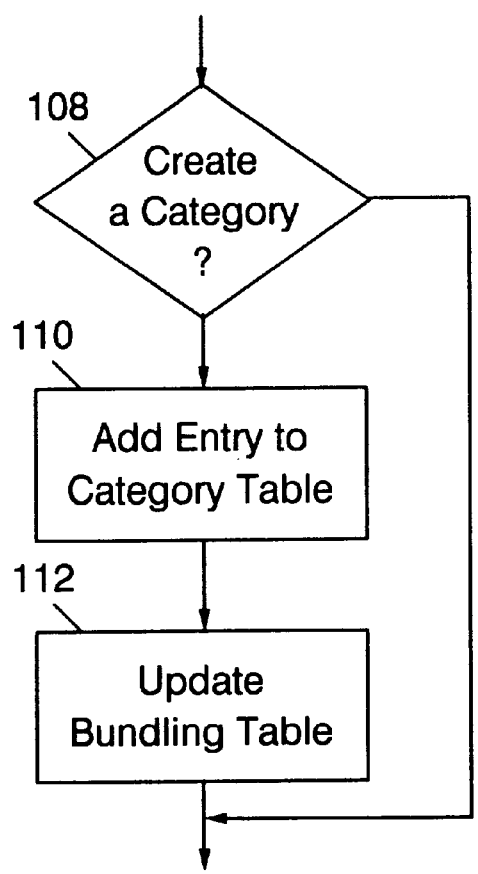
FIG. 9 is a flow chart illustrating a system method of creating a new category which can be distributed according to the invention.

FIG. 9 illustrates what needs to be accomplished to create a new category. When a new category is to be created (block 108), the first step is to add the listing of the new category in the category table (block 110). After that, the bundling table is updated (block 112) by adding an entry in the table for each item in the new category. Thus, both the category table and the category bundling table are updated to reflect the new category.

Figure 10:
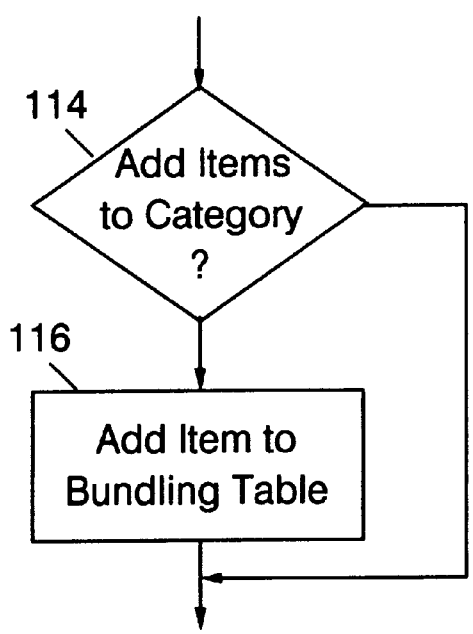
FIG. 10 is a flow chart illustrating a system method of adding items to a category which can be distributed according to the invention.

FIG. 10 illustrates what needs to be accomplished to add items to a category. When that determination is made (block 114), the item is added to the category bundling table (block 116). Since the items are assumed to be existing categories and files, the category and file tables do not need to be changed.

Figure 11:
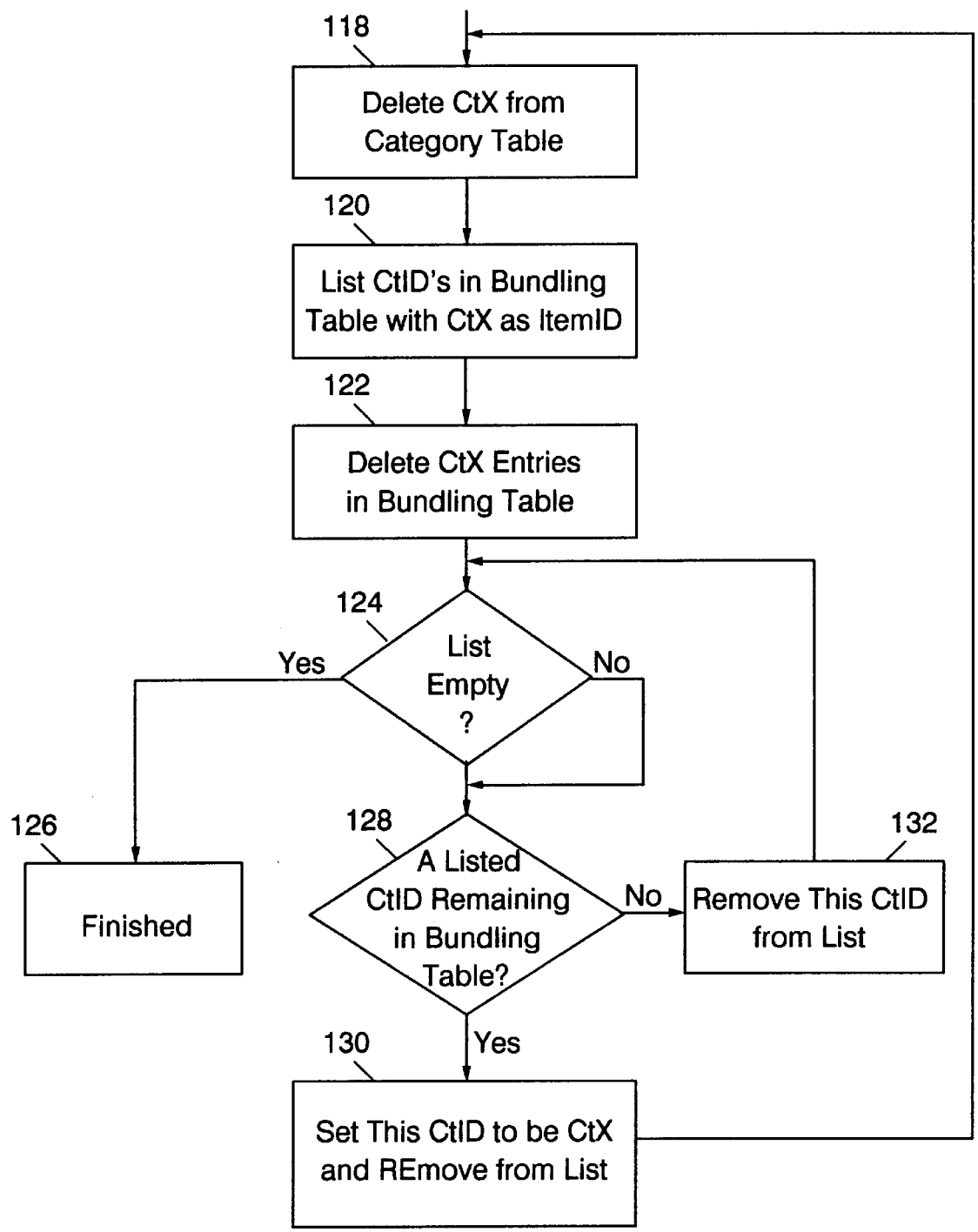
FIG. 11 is a flow chart illustrating a system method of removing a category from distribution according to the invention.

FIG. 11 illustrates what needs to be done to remove a category from consideration by the system. First, the category to be removed (CtX) is deleted from the category table (block 116). Then, a list is developed containing the CtID's in the bundling table which have the CtX to be removed as an ItemID for those CtID's (block 120). Next, the entries containing CtX in the bundling table are all removed (block 122). They can be in both the CtID and ItemID columns. If the list is now empty of CtID's (block 124), the process is finished (block 126). If there is a next CtID on the list, a determination is made whether it is still existing in the bundling table (block 128). If so, that CtID is removed from the list (block 130) and this CtID is used for the CtX of another run through the process, thereby removing the listed CtID from the appropriate tables. If it is not remaining in the bundling table, the CtID is removed from the list (block 132) and process flow is directed to block 124 for any other CtID's on the list. By using this technique, the category bundling table can be systematically purged of categories which have been removed from the category table.

Figure 12:
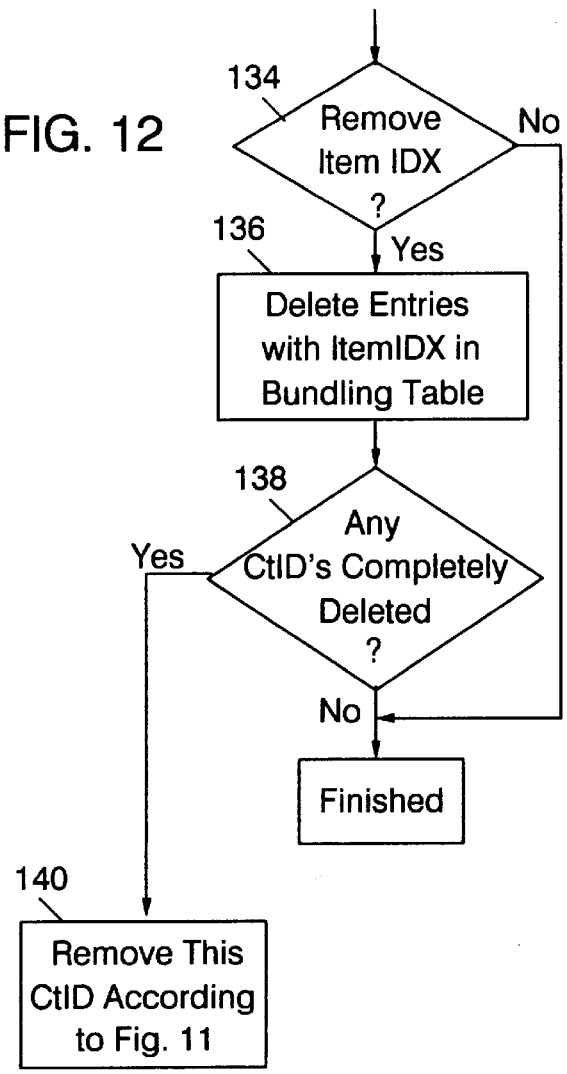
FIG. 12 is a flow chart illustrating a system method of removing an item from a category for distribution according to the invention.

FIG. 12 illustrates what needs to be done to remove an item (ItemIDX) from the system. After it is determined that an item will be removed (block 134), all entries in the bundling table which include that item are deleted (block 136). Next, a determination is made whether any CtID is completely eliminated from the bundling table (block 138) by the item entry deletion. If not, the process for removing items is finished. If any CtID's were completely deleted, they are removed (block 140) by using the procedure illustrated in FIG. 11.

Figure 13:
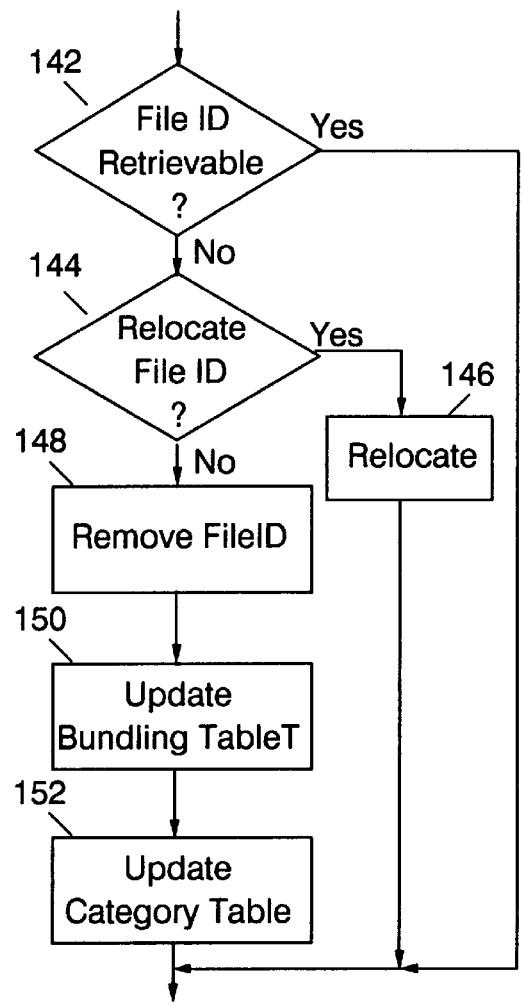
FIG. 13 is a flow chart illustrating a method of file and category maintenance according to a specific embodiment of the invention.

To maintain the robustness of the category linkages, especially in a web environment, the category links should be checked periodically. Categories that lead to no retrievable content files should be removed. FIG. 13 illustrates this procedure. A determination is made whether a file (specified by FileID) is retrievable (block 142). If so, no further action is necessary. In not, a check is made to see if it is retrievable but its location has changed, or relocated (block 144). If so, the file is relocated (block 146). If not, the file is removed (block 148), the bundling table is updated (block 150) by removing the file item, if necessary, and the category table is updated to remove any empty categories (block 152).

It is emphasized that numerous changes may be made in the above-described embodiments without departing from the teachings of the invention. For example, the system may display the navigation pages in different format than shown in FIGS. 6, 7 and 8. Also, it may be desirable to display on the user's screen an interactive table of contents which is based upon the category hierarchy information. This can be implemented with Java applets for web applications or with GUI toolkits for other client/server applications. Directed graph visualization tools can also be used to assist the navigation.

It is intended that all of the matter contained in the foregoing description, or shown in the accompanying drawings, shall be interpreted as illustrative rather than limiting.

Having thus described the invention, what is claimed is:

1. A system for distributing, to a computer user, categorized information relating to data available for use by the computer user, said system comprising:

file table means for storing information about the available data;

category table means for storing information which identifies a plurality of categories which are descriptive headings related to the available data;

category bundling table means for storing information which determines the hierarchy relationship between said categories and available data; and manager means for responding to a user inquiry by providing information to the user which is indicative of the hierarchy relationships in said category bundling table means relevant to the specific user inquiry.

2. The information distributing system of claim 1 wherein the information stored in the file table means includes location and identity information for the available data.

3. The information distributing system of claim 2 wherein the information stored in the file table means also includes title and format type for the available data.

4. The information distributing system of claim 1 wherein the information stored in the category table means includes an entry which indicates if the corresponding category is a terminate category.

5. The information distributing system of claim 1 wherein the information stored in the category bundling table means includes an entry which indicates if a corresponding item entry is a terminate item.

6. The information distributing system of claim 5 wherein the information stored in the category bundling table means includes, for each identified category, an associated sub-category identifier when the associated item entry is not a terminate item, or a file identifier when the associated item entry is a terminate item.

7. The information distributing system of claim 1 wherein the manager means includes:

means for adding new categories to the category table means; and means for updating the category bundling table means to correctly reflect the newly added category.

8. The information distributing system of claim 7 wherein the manager means also includes:

means for adding new items to a category by adding the items to said bundling table means.

9. The information distributing system of claim 8 wherein the manager means also includes:

means for removing a category from the category table means and the category bundling table means.

10. The information distributing system of claim 9 wherein the manager means also includes:

means for removing an item from the category bundling table means.

11. The information distributing system of claim 1 wherein the manager means also includes:

means for providing data to create a navigation page which is based, at least in part, upon matches between a user selected category and associated categories and files stored in the category bundling table means, said page permitting both upward and downward navigation through associated categories;

means for determining user selection of the next navigation direction through said page; and if the user selects to navigate upwards, creating and sending to the user data to create a new navigation page which contains, at least, higher level categories associated with said user selected category;

if the user selects to navigate downwards, creating and sending to the user data to create a new navigation page which contains, at least, lower level sub-categories associated with said user selected category; and if the user selects to receive a file, locating and sending that file to the user.

12. A method of distributing, to a computer user, categorized information indicative of available data, said method including the steps of:

storing location and identity information of the available data in a file table;

storing descriptive category information in a category table;

storing, in a category bundling table, information definitive of the hierarchy relationship between the available data and the category information;

searching said category bundling table responsive to a request by the user for information; and based upon said search, returning data to the user indicative of the hierarchy relationship between the stored categories.

13. The method of distributing categorized information of claim 12 including the step of:

structuring the returned data so that the user may respond again by requesting an upward movement from a category, a downward movement from a category, or a data access to a terminate file.

14. The method of distributing categorized information of claim 13 wherein moving downward from a specific category and then moving back upward from the same category results in a different set of categories in the returned data from which s another downward movement may be made.

15. The method of distributing categorized information of claim 12 wherein the information stored in the file table also includes title and format type for the available data.

16. The method of distributing categorized information of claim 12 wherein the information stored in the category table includes an entry which indicates if the corresponding category is a terminate category.

17. The method of distributing categorized information of claim 12 wherein the information stored in the category bundling table includes an entry which indicates if a corresponding item entry is a terminate item.

18. The method of distributing categorized information of claim 12 wherein the information stored in the category bundling table includes, for each identified category, an associated sub-category identifier when the associated item entry is not a terminate item, or a file identifier when the associated item entry is a terminate item.

19. The method of distributing categorized information of claim 12 further including the steps of:

adding new categories to the category table and updating the category bundling table to correctly reflect newly added categories;

adding new items to a category by adding the items to said bundling table;

removing a category from the category table and the category bundling table; and removing an item from the category bundling table.

20. A method for real-time distribution, to an online computer user, of categorized information indicative of available data, said method including the steps of:

storing location, identifier, and title information of the available data in a file table;

storing descriptive category information in a category table, including entries which indicate the category title and if the category is a terminate category;

storing, in a category bundling table, information definitive of the hierarchy relationship between the available data and the category information, such definitive information including, for each identified category, an entry which indicates if a corresponding item entry is a terminate item, and an associated sub-category identifier when the associated item entry is not a terminate item, or a file identifier when the associated item entry is a terminate item;

searching said category bundling table responsive to a request by the user for information;

based upon said search, returning data to the user indicative of the hierarchy relationship between the stored categories;

structuring the returned data so that the user may respond again by requesting an upward movement from a category, a lower movement from a category, or a data access to a terminate file; and dynamically maintaining the accuracy and usefulness of the system by periodically changing the categories listed in the category table, updating the category bundling table to correctly reflect changes in the listed categories, and changing the items in a category.

\* \* \* \* \*